United States Patent [19]

Chavez, Jr. et al.

[11] Patent Number: 5,758,285
[45] Date of Patent: May 26, 1998

[54] INCREASING THE CAPACITY OF A PERSONAL COMMUNICATION SERVICE SYSTEM BY MULTIPLE CONNECTIONS TO INDIVIDUAL TELEPHONE LINKS

[75] Inventors: David Lee Chavez, Jr., Thornton; Michael Ray Ross, Westminster, both of Colo.

[73] Assignee: Lucent Technologies Inc., Murray Hill, N.J.

[21] Appl. No.: 565,476

[22] Filed: Nov. 30, 1995

[51] Int. Cl.⁶ .................................................. H04M 11/00
[52] U.S. Cl. ............................................ 455/445; 455/436
[58] Field of Search ................................. 379/58, 59, 60, 379/63; 455/33.1, 435, 436, 437, 465, 466, 445; 370/359

[56] References Cited

U.S. PATENT DOCUMENTS

| | | | |
|---|---|---|---|
| 4,970,723 | 11/1990 | Lin | 370/359 |
| 4,980,907 | 12/1990 | Raith et al. | 379/63 |
| 5,040,177 | 8/1991 | Martin et al. | 370/110.1 |
| 5,182,751 | 1/1993 | Bales et al. | 370/110.1 |
| 5,202,912 | 4/1993 | Breeden et al. | 379/57 |
| 5,222,123 | 6/1993 | Brown et al. | 379/57 |
| 5,243,641 | 9/1993 | Evans et al. | 455/465 |
| 5,325,419 | 6/1994 | Connolly et al. | 455/435 |
| 5,371,782 | 12/1994 | Casey, III et al. | 379/61 |
| 5,390,241 | 2/1995 | Bales et al. | 379/207 |
| 5,396,541 | 3/1995 | Farwell et al. | 379/60 |
| 5,521,963 | 5/1996 | Shrader et al. | 455/437 |
| 5,590,172 | 12/1996 | Lodwig et al. | 455/436 |
| 5,598,412 | 1/1997 | Griffith et al. | 455/466 |

FOREIGN PATENT DOCUMENTS

9401976  1/1994  WIPO ............................. H04Q 7/04

*Primary Examiner*—Dwayne Bost
*Assistant Examiner*—Myron K. Wyche
*Attorney, Agent, or Firm*—John C. Moran

[57] ABSTRACT

Assigning one telephone link to each wireless set and connecting each of the assigned telephone links to all of a plurality of PCS systems. Each of the PCS systems has a plurality of base stations on which wireless sets can register. When an incoming call is received for a wireless set by a switching system terminating the telephone links, the switching system transmits a new call message on the telephone link assigned to the wireless set. The PCS system on which the wireless set is registered responds to the new call message by establishing a connection from the wireless set to the telephone link. The other PCS systems monitor the state of the call so that if the wireless set physically moves to a base station connected to a new PCS system, the new PCS system can continue the call without interruption or the switching system having to perform any additional operations. Also, the PCS systems can be relatively small. When additional wireless sets are added, it is only necessary to add another PCS system and to connect all of the telephone links identified with wireless sets to the new PCS system.

12 Claims, 7 Drawing Sheets

INCREASING THE CAPACITY OF A PERSONAL COMMUNICATION SERVICE SYSTEM BY MULTIPLE CONNECTIONS TO INDIVIDUAL TELEPHONE LINKS

TECHNICAL FIELD

This invention relates to personal communication service systems, and, in particular, to expanding the capacity of a personal communication system that is interfaced to a telecommunication switching system.

BACKGROUND OF THE INVENTION

Within the prior art, it is known to connect a personal communication service (PCS) system to a central office (also referred to as a local exchange) or to a business telecommunication switching system (also referred to as a PBX) using what is referred to as a line appearance connection. In a line appearance connection, each wireless set that can connect to the PCS system has a unique telephone number and telephone link on the switching system. The PCS system terminates each of these telephone links and is responsive to a call being received on a telephone link to connect that call to the wireless set assigned to that telephone link. When a wireless set originates a telephone call, the PCS system originates a call via the switching system on the telephone link assigned to the originating wireless set. The principal advantage of the line appearance connection method is that all telephone features are provided by an existing commercial switching system, and the wireless domain becomes independent of the local switching system. In addition, the switching system provides the necessary billing and recording of telephone charges associated with calls originated by a wireless set. The PCS system requires a smaller program to control its functions since the more complicated telephone features and operations are performed by the switching system. The line appearance connection method is particularly useful for adding PCS service to a PBX since the cost of the control portion of the PCS system is relatively low in comparison to a PCS system that provides all of the telephone features and operations. In addition, administration tasks associated with assigning features and telephone numbers to a wireless set are performed by the administration facilities of the switching system. Also, since standard telephone links are utilized to interconnect the PCS system with the switching system, the line appearance connection method allows the PCS system to be added to a large number of existing PBXs from various manufacturers.

The line appearance connection method does however suffer from a number of problems. For a small number of wireless sets, the line appearance connection method works extremely well since the PCS system is small and relatively inexpensive. In addition, the more complex switching operations, e.g., conferencing, are provided by the switching system. However, as the number of wireless sets grows, it is necessary to increase the switching capabilities of the PCS system so that an active wireless set can be connected to its dedicated telephone link via the PCS system. In addition, the PCS system must be able to control a proportional number of base stations to the wireless sets. Within many PCS systems, a base station can handle a maximum of two to four active wireless sets. Consequently, for a large PCS system, there are a large number of base stations. This large number of base stations further complicates the problem of increasing the size of the PCS system as the number of wireless sets increases. Indeed, for a large number of wireless sets the PCS system approaches the complexity of the connected switching system.

What is needed then is a way of growing a PCS system utilizing the line appearance connection method from a small system to a large system.

SUMMARY OF THE INVENTION

The foregoing problems are solved, and a technical advance in the art is achieved by assigning one telephone link to each wireless set and connecting each of the assigned telephone links to all of a plurality of PCS systems. Each of the PCS systems has a plurality of base stations on which wireless sets can register. When an incoming call is received for a wireless set by a switching system terminating the telephone links, the switching system transmits a new call message on the telephone link assigned to the wireless set. The PCS system on which the wireless set is registered responds to the new call message by establishing a connection from the wireless set to the telephone link. The other PCS systems monitor the state of the call so that if the wireless set physically moves to a base station connected to a new PCS system, the new PCS system can continue the call without interruption or the switching system having to perform any additional operations. Advantageously, the PCS systems can be relatively small. When additional wireless sets are added, it is only necessary to add another PCS system and to connect all of the telephone links identified with wireless sets to the new PCS system.

Advantageously, the telephone link may be a basic rate interface (BRI) link. The plurality of PCS systems are connected to each individual BRI link utilizing the multipoint/passive bus feature of the ISDN protocol. In addition, the telephone link may advantageously be an analog link.

These and other advantages and features of the invention will become apparent from the following description of illustrative embodiments of the invention taken together with the drawing.

DETAILED DESCRIPTION

Figure 1:
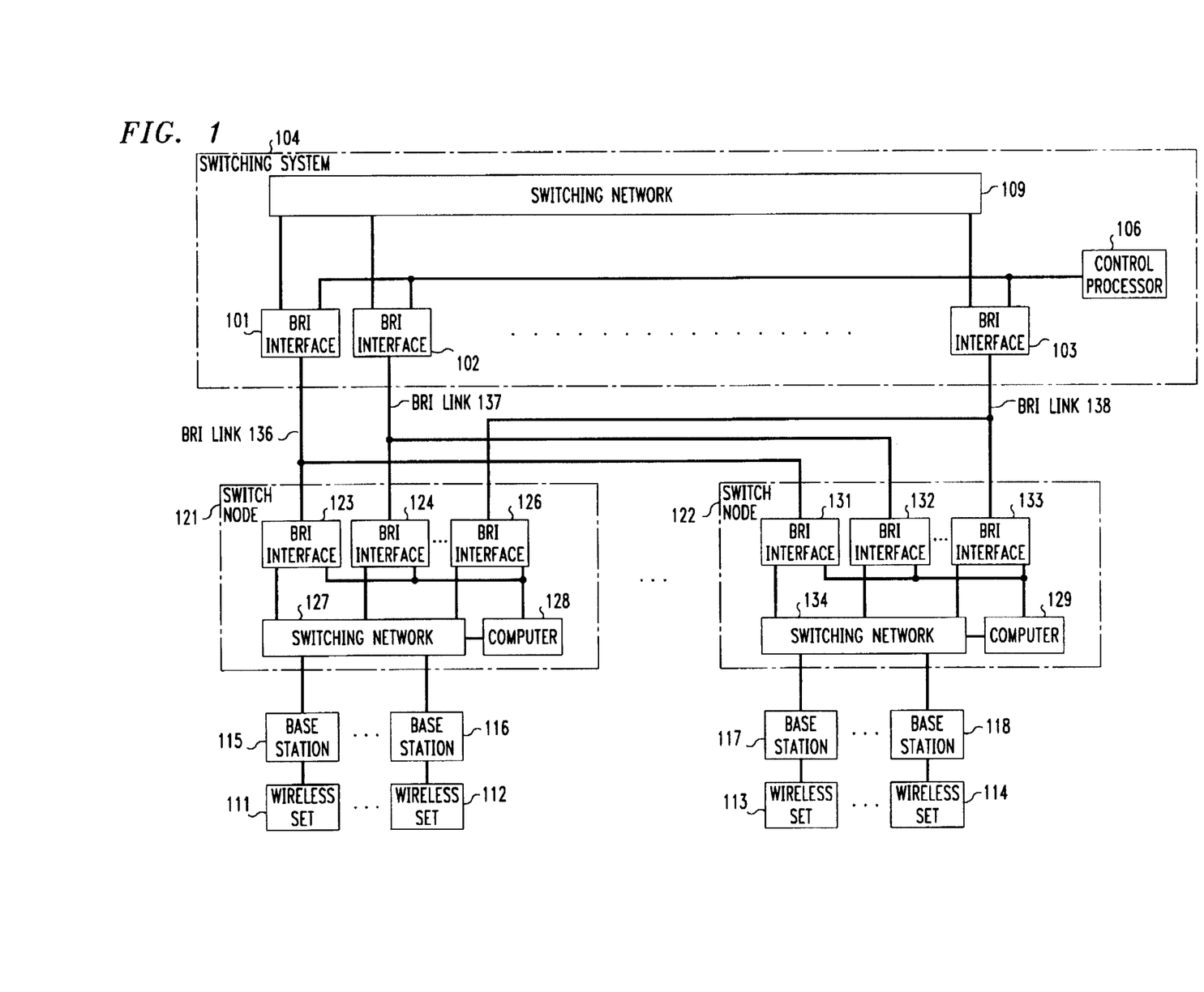
FIG. 1 illustrates, in block diagram form, a first embodiment of the invention.

FIG. 1 illustrates a first embodiment of the invention. Switching system 104 is a central office (also referred to as a local exchange) or a business telecommunications switching system (also referred to as a PBX). Control processor 106 provides overall control of BRI interfaces 101, 102 through 103 and switching network 109. Not illustrated in FIG. 1 are the primary rate interfaces (PRI) that interconnect switching system 104 to other switching systems and the public telephone network. In addition, wired telephone sets are also connected to switching system 104 via analog or BRI interfaces not illustrated in FIG. 1. Switching system 104 may advantageously be the Definity Business Telecommunications Switching System manufactured by AT&T. Switch nodes 121 through 122 are the PCS systems. Each switch node has attached to it a plurality of base stations such as base stations 115 through 116 which are connected to switch node 121. Computer 128 provides overall control for switch node 121. BRI interfaces 123, 124 through 126 are used to terminate BRI links 136, 137 through 138, respectively. Switching network 127 also terminates the links interconnecting switch node 121 to base stations 115 through 116. These links interconnecting the base stations may be one or more BRI links or a PRI link. The interfaces for connecting the links to the base stations is assumed to be in switching network 127. Switching network 127 also has tone detection and tone generation circuits. Elements 129 through 134 of switch node 122 perform similar operations to elements 128 and 123 through 127 of switch node 121. Greater detail on switch nodes 129 through 122 is given in U.S. Pat. No. 5,386,466 that is hereby incorporated by reference.

Switching system 104 is administered so that one BRI interface is assigned to each wireless set. For example, BRI interfaces 101, 102, and 103 are assigned to wireless sets 111, 112, and 113, respectively. In each switch node there is a corresponding BRI interface that terminates the BRI link connected to a BRI interface in switching system 104. For example, BRI interface 123 terminates BRI link 136 that is connected to BRI interface 101, and BRI interface 131 in switch node 122 also terminates BRI link 136. Similarly, BRI interface 124 of switch node 121 terminates BRI link 137 that is connected to BRI interface 102 of switching system 104, and BRI interface 132 of switch node 122 also terminates BRI link 137. A similar termination is performed on BRI link 138 by BRI interfaces 126, 133, and 103. If additional base stations are required in order to handle additional wireless sets or increase traffic by existing wireless sets, then another switch node is added, and this switch node will also terminate BRI links 136, 137 through 138. Computer 128 of switch node 121 controls the operation of BRI interfaces 123 and 124 through 126 and switching network 127. Computer 128 terminates the ISDN protocol that is utilized on the BRI links.

The wireless sets can utilize a variety of air protocols such as CT2 or PHS (that is utilized in Japan). In the PHS protocol, the wireless sets automatically register themselves with the base station whose signal is the strongest. Computer 128 maintains a record that defines to which base station a particular wireless set is registered. In the CT2 protocol, the wireless sets do not automatically register; and if an incoming call is received, it may be necessary for computer 128 to have the base stations page for the wireless set. The other switch nodes such as switch node 122 are similar in design to switch node 121.

Switching system 104 implements the multipoint/passive bus feature of the ISDN protocol on BRI links 136 and 137 through 138. This feature allows a BRI link to be terminated by multiple ISDN terminals.

To better understand the operation of the apparatus illustrated in FIG. 1, consider the following example where an incoming call is received by switching system 104 for wireless set 111 that is registered on base station 115. Since wireless set 111 has been assigned to BRI interface 101, control processor 106 transmits a set up message on BRI link 136 in response to the incoming call. The set up message is received by BRI interface 123 of switch node 121 and BRI interface 131 of switch node 122. Since wireless set 111 is registered on base station 115, computer 128 transmits a setup message to wireless set 115 via switching network 127 and base station 115. Also, computer 128 transmits an alert message back to control processor 106 via BRI interface 123, BRI link 136, and BRI interface 101. Since wireless set 111 is not registered on base stations 117 through 118, computer 129 in switch node 122 takes no action with respect to the set up message from switching system 104. Computer 129 does however maintain the call state of wireless set 111 and records in an internal table associated with BRI interface 131 the fact that a call set up message has been sent for wireless set 111. When wireless set 111 answers the incoming call, computer 128 sets up a talk path for wireless set 111 via base station 115, BRI link 136, switching network 127, BRI interface 123, and BRI interface 101 to switching network 109. In addition, computer 128 transmits back a connect message to control processor 106. Control processor 106 is responsive to the connect message to transmit back the connect acknowledge message which also designates which B channel of BRI link 136 is to be used. Computer 129 is responsive to the connect acknowledge message to record that wireless set 111 is active on a call.

During the call, if wireless set 111 physically moves and establishes communication and performs authentication with base station 117, wireless set 111 transmits a setup message to computer 129 of switch node 122. The setup message defines that wireless set 111 is performing a handoff operation. Consequently, computer 129 establishes a talk path for wireless set 111 via base station 117, switching network 134, BRI link 136, and BRI interface 131. In addition, computer 129 transmits an INFO message to control processor 106 indicating that a dummy button has been actuated on wireless set 111. Control processor 106 responds to that INFO message by transmitting an INFO message that updates a dummy indicator associated with the dummy button. This is done so as to inform computer 128 in switch node 121 that a handoff has occurred. In response to the INFO message from control processor 106, computer 128 removes the call path from base station 115 to BRI interface 123. In addition, computer 128 places BRI interface 123 in an idle state. Note, BRI interface 123 continues to receive messages from control processor 106 via BRI link 136 and continues to transfer those messages to computer 128. Control processor 106 must be administered to reflect the dummy button and dummy indicator. Since control processor 106 believes that there is a multi-button multi-indicator ISDN station set attached to BRI link 136, this is not a problem. Note also, that base station 115 is aware that wireless set 111 is no longer active once communication between base station 115 and wireless set 111 ceases.

Consider now where wireless set 111 while registered on base station 117 terminates the call; and at a later point in time, wireless set 111 registers on base station 115 and originates a call. Computer 129 of switch node 122 is responsive to the termination of the call by wireless set 111 on base station 117 to transmit the disconnect message to control processor 106 of switching network 109. Control processor 106 is responsive to the disconnect message to transmit a disconnect acknowledge message to computer 129 via BRI link 136. Computer 128 in switch node 121 monitors the exchange of these messages and records in its internal table that wireless set 111 is now idle. When wireless set 111 reregisters on base station 115, computer 128 records this registration in its internal table. When wireless set 111 originates a call, computer 128 collects the destination telephone number from wireless set 111 and then transmits a set up message via BRI interface 123, BRI link 136, and BRI interface 101 to control processor 106. Computer 129 in switch node 122 records the transmission of the call set up message and subsequent messages and records in its internal table associated with wireless set 111 the fact that wireless set 111 is now active on a call.

Figure 2:
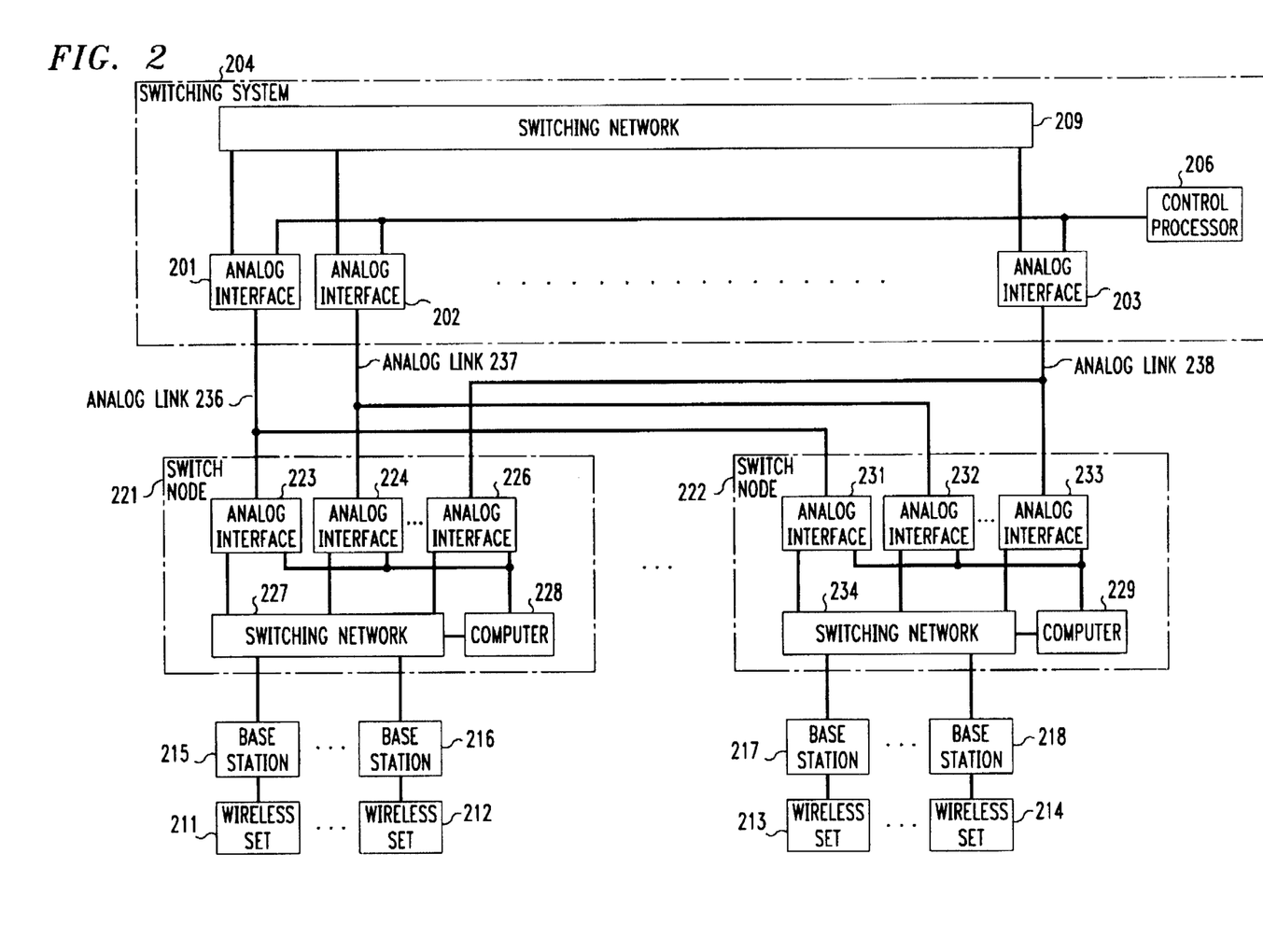
FIG. 2 illustrates, in block diagram form, a second embodiment of the invention.

FIG. 2 illustrates a second embodiment of the invention. The overall function of elements 201 through 238 is similar to the operations of elements 101 through 138 of FIG. 1. However, switching system 204 is interconnected to switch nodes 221 through 222 via analog links rather than BRI links. Consequently, the link interfaces are analog interfaces for FIG. 2 rather than the BRI interfaces of FIG. 1.

To understand the operation of the apparatus illustrated in FIG. 2 consider the example where switching system 204 receives a telephone call for wireless set 211. Further, assume that wireless set 211 is registered on base station 215. Upon receiving the incoming call, control processor 206 applies a ringing signal to analog link 236 via analog interface 201. Computers 228 and 229 determine that ringing signal is being applied to analog link 236 via analog interface 223 and 231, respectively. Since wireless set 211 is registered on base station 215, computer 228 transmits an alerting message to wireless set 211. When wireless set 211 answers the call, computer 228 causes analog interface 223 to go off hook on analog link 236. Analog interface 201 in switching system 204 is responsive to analog interface 223 to signal control processor 206 which stops the ringing signals being transmitted on analog link 236. Computer 228 than establishes a talk path between wireless set 211 and analog link 236 via base station 215, switching network 227, and analog interface 223. Control processor 206 establishes a talk path from the calling party via switching network 209 and analog interface 201 to analog link 236. Computer 229 detects the transmission of the ringing signals on analog link 236, but since wireless set 211 is not registered on base stations 217 through 218, computer 229 takes no action.

During the call, if wireless set 211 physically moves and establishes communication base station 217, wireless set 211 transmits a setup message to computer 229 and specifies in the setup message that a call handoff is occurring. Computer 229 then performs the authentication operation with respect to wireless set 211. Computer 229 sends a call proceeding message to wireless set 211. Computer 229 then causes analog interface 231 to go off hook on analog link 236 and sets up a talk path between wireless set 211 and analog link 236. After performing these operations, computer 229 transmits a connect message to wireless set 211 and processes the call in a normal manner. Base station 215 transmits to computer 228 a lost communication with wireless set message. Computer 228 is responsive to this message to remove the talk path between base station 215 and analog interface 223. Computer 228 also places analog interface 223 on hook.

Consider now where wireless set 211 originates a call while registered on base station 215. Computer 228 is responsive to the origination message from wireless set 211 to place analog interface 223 in the off hook state. In addition, computer 228 creates a voice path from wireless set 211 via base station 215, switching network 227, and analog interface 223 to analog link 236. Control processor 206 is responsive to the off hook state of analog interface 223 to transmit a dial tone from a tone generator in switching network 209 to analog link 236 via analog interface 201. Upon hearing the dial tone, the user of wireless set 211 dials the destination telephone number. Computer 228 is responsive to this dial destination number to convert the number into multifrequency dialing tones which are transmitted to analog link 236 via a tone generator in switching network 227 and analog interface 223. Control processor 206 utilizes a tone detector in switching network 209 to recover the destination telephone number, and control processor 206 then controls switching network 209 so that the call is completed to the destination telephone number.

Figure 3:
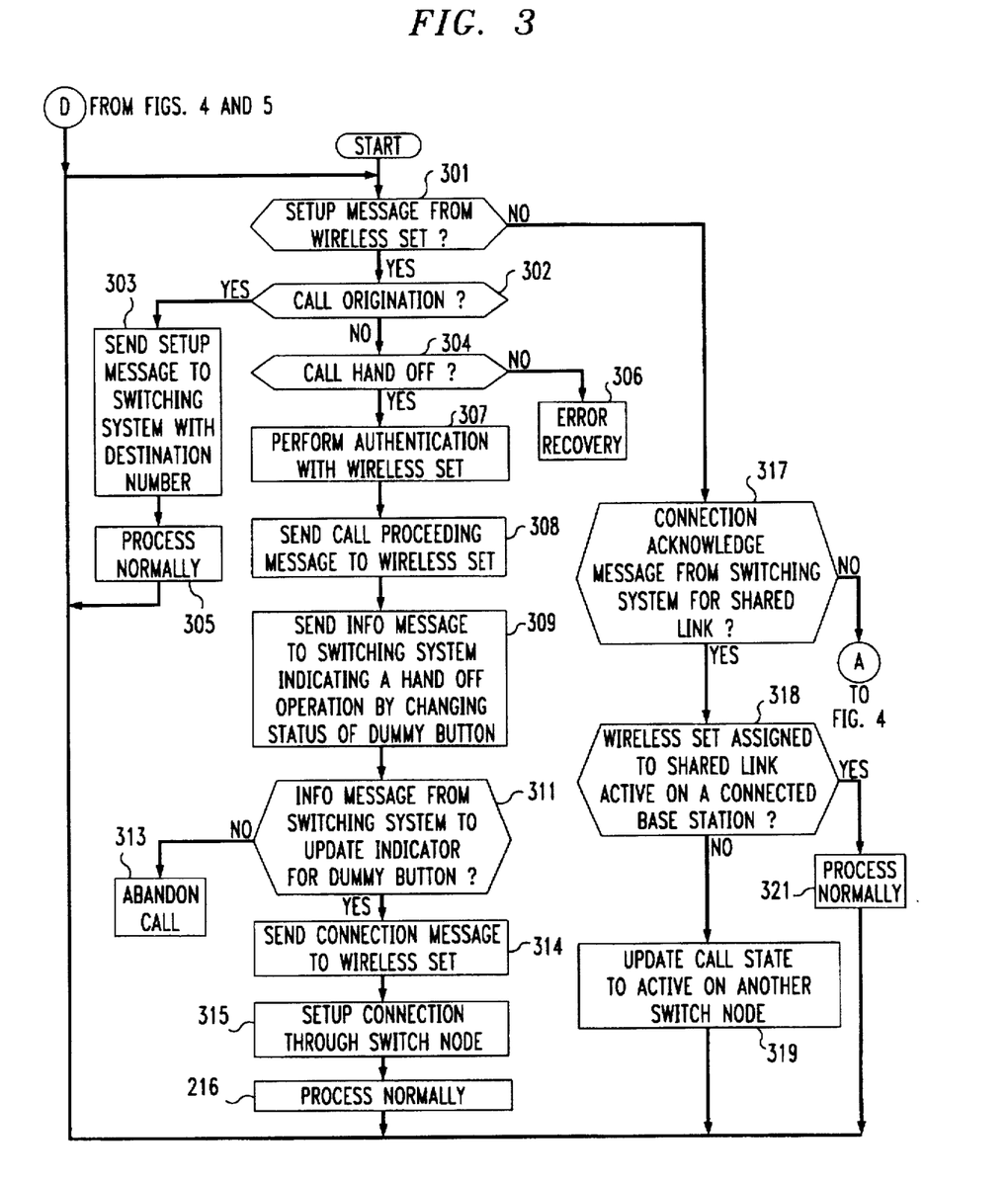
FIGS. 3 through 6 illustrate operations performed by the switch nodes to implement the first embodiment.

FIGS. 3 through 6 illustrate the operations performed by the computers in the switch nodes of FIG. 1. In FIG. 3, decision block 301 determines if a setup message has been received from a wireless set. A setup message indicates that the wireless set is either doing a call origination or in the process of doing a call handoff operation. If the answer in decision block 301 is yes, control is transferred to decision block 302. The latter decision block determines if the setup message indicates that the wireless set is doing a call origination. If the answer is yes, control is transferred to block 303 which sends a setup message to the switching system using the destination number that was in the setup message from the wireless set. The call is then processed in a normal manner by block 305 before control is once again returned to decision block 301.

Returning to decision block 302, if the answer is no, control is transferred to decision block 304. The latter decision block determines if the wireless set is performing a handoff operation. If the answer is no, control is transferred to block 306 for error recovery. If the answer in decision block 304 is yes, control is transferred to block 307 which performs the authentication operations with the wireless set. Control is then transferred to block 308. Block 308 sends a call proceeding message back to the wireless set, and block 309 sends an INFO message to the switching system indicating that a dummy button has been actuation. Decision block 311 then determines if a INFO message to update the indicator associated with the dummy button has been received from the switching system. This INFO message indicates a handoff operation to the other switch nodes. If the answer is no, block 313 abandons the call. If the answer in decision block 311 is yes, block 314 sends a connection message to the wireless set. Next, block 315 sets up a connection through the switch node to establish communication from the wireless set to the switching system. After this, the call is handled in a normal manner by block 316 which will return control for operations with other wireless sets to decision block 301.

Returning to decision block 301, if the answer is no, control is transferred to decision block 317. The latter decision block determines if a connect acknowledge message was received from the switching system for a shared link. Such a connect acknowledge message could result from the switch node having transmitted a connection message to the switching system or another switching system having sent the connection message. If the answer in decision block 317 is yes, decision block 318 determines if the wireless set is active on a base station connected to the switch node. If the answer in decision block 318 is no, block 319 records that the wireless set is active on a call on another switch node with the other switch node having been specified in the connection acknowledge message. During a handoff operation, a wireless set can be marked as being active on two switch nodes. Control is then transferred back to decision block 301. Returning to decision block 318, if the answer is yes, control is transferred to block 321 which performs normal processing.

Figure 4:
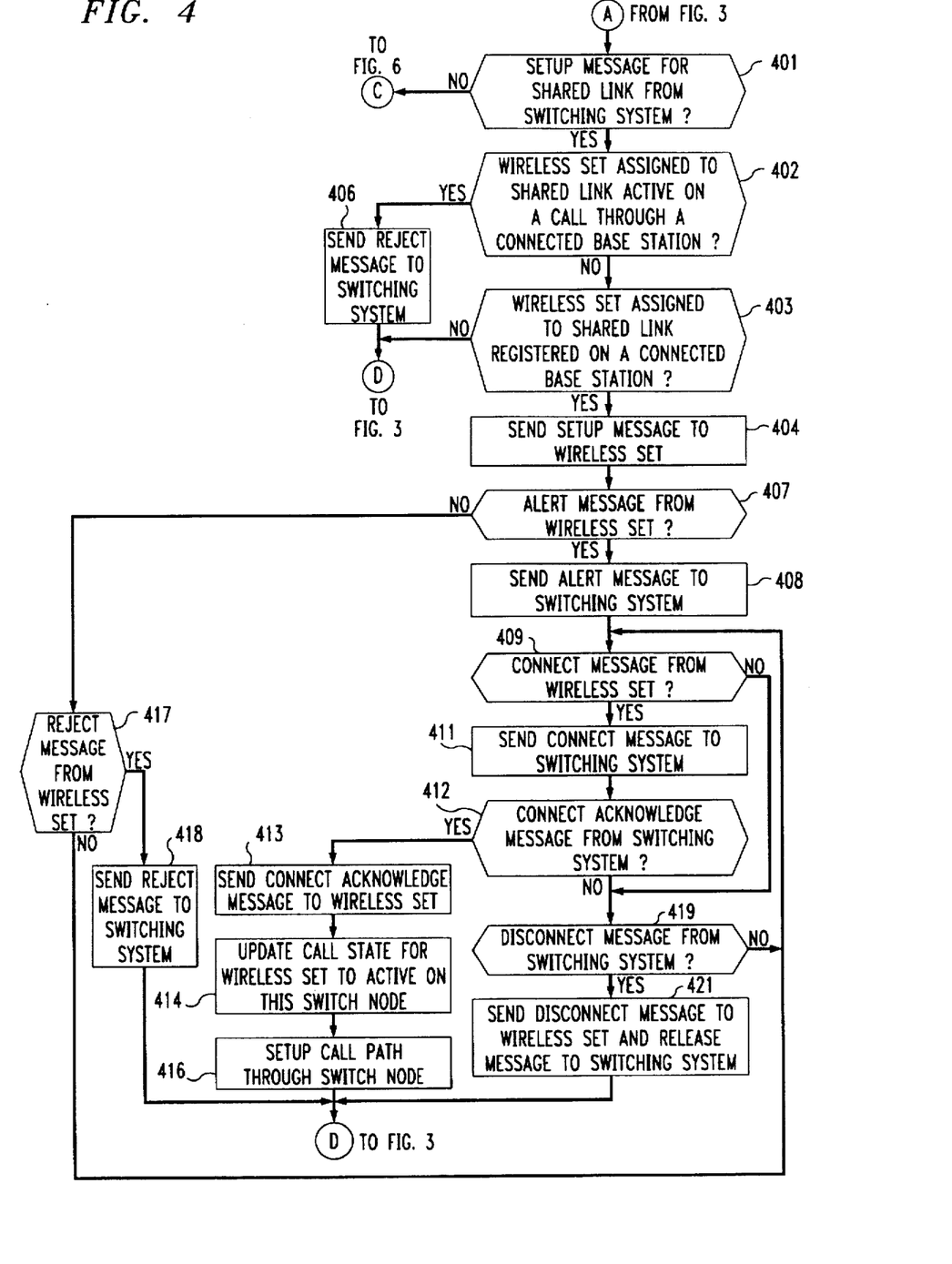

Returning to decision block 317 of FIG. 3, if a connect acknowledge 30 message was not received from the switching system, control is transferred to decision block 401 of FIG. 4. Decision block 401 determines if a setup message for a shared link has been received from the switching system. If the answer is yes, control is transferred to decision block 402. The wireless set to which the setup message is being directed may be registered on another switch node or may be busy. Decision block 402 determines if the called wireless set is busy on a call on a connected base station in this switch node. If the answer is yes, control is transferred to block 406 which sends a reject message to the switching system before returning control back to decision block 301 of FIG. 3. If the answer in decision block 402 is no, decision block 403 determines if the wireless set is presently registered on a connected base station to this switch node. If the answer is no, control is returned to decision block 301 of FIG. 3. If the wireless is not registered on this switch node, the switch node will wait to mark the wireless set as being active on another switch node until the call completion message is received from the switching system. However, if the wireless set is registered on this switch node, control is transferred to block 404 which sends a setup message to the wireless set.

After execution of block 404, decision block 407 waits for an alerting message from the wireless set. If an alerting message is not received, control is transferred to decision block 417 which determines if a reject message was received from the wireless set. If the answer is yes, a reject message is sent to the switching system by block 418 before control is returned back to decision block 301 of FIG. 3.

If an alert message was received from the wireless set, control is transferred to block 408 which sends an alert message to the switching system and then transfers control to decision block 409. After reception of the alert message from the wireless set, decision block 409 determines if a connect message has been received from the wireless set. When the user of the wireless set answers the telephone call, the wireless set transmits a connection message. If decision block 409 determines that a connection message was not received from the wireless set, control is transferred to decision block 419 whose operations are described below. If the answer in decision block 409 is yes, block 411 sends a connect message to the switching system, and decision block 412 determines if a connect acknowledge message has been received from this switching system. If the answer in decision block 412 is no, decision block 419 determines if a disconnect message was received from the switching system. The reception of the disconnect message from the switching system indicates that the calling party had abandoned the call. If the answer in decision block 419 is yes, control is transferred to block 421 which sends a disconnect message to the wireless set and a release message to the switching system before transferring control back to decision block 301 of FIG. 3.

Returning to decision block 419, if the answer is no, control is transferred back to decision block 409. Returning to decision block 412, if the answer is yes, block 413 transmits a connect acknowledge message to the wireless set, and block 414 updates the call state for the wireless set to active on this switch node. Finally, block 416 sets up a call path through the switch node between the wireless set and the switching system before transferring control back to decision block 301 of FIG. 3.

Figure 5:
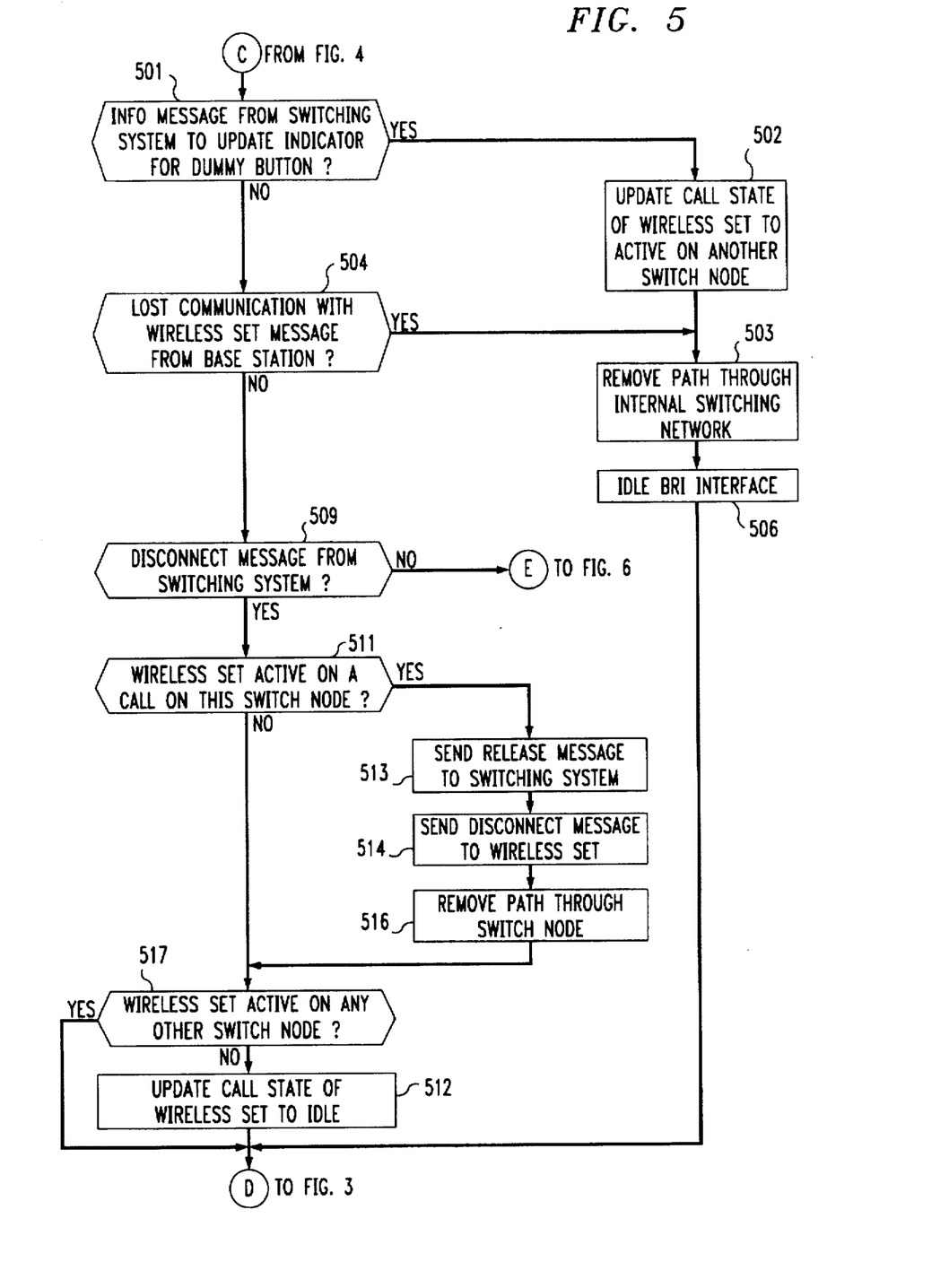

Returning to decision block 401 of FIG. 4, if the answer in decision block 401 is no, control is transferred to decision block 501 of FIG. 5. Decision block 501 determines if a INFO message has been received to update the indicator associated with the dummy button. This INFO message means that the wireless set is now active on another switch node. If the answer in decision block 501 is yes, block 502 updates the call state of the wireless set to active on another switch node. Block 503 removes the talk path through the internal switching network of the node, and block 506 idles the BRI interface associated with the wireless set before control is transferred back to decision block 301 of FIG. 3. If the answer in decision block 501 is no, decision block 504 determines if the "lost communication with wireless set" message has been received from the base station. If the answer is yes, control is transferred to block 503 whose operations have already been discussed.

If the answer in decision block 504 is no, decision block 509 determines if a disconnect message has been received from the switching system. If the answer is yes, decision block 511 determines if the wireless set is active on a call on this node. If the answer is yes, block 513 sends a release message to the switching system, and block 514 sends a disconnect message to the wireless set. Block 516 then removes the path through the switch node and transfers control to decision block 517. Decision block 517 determines if the wireless set has been determined to be active on any other switch node. If the answer is yes, control is transferred back to decision block 301 of FIG. 3. If the answer is no, control is transferred to block 512 which updates the call state of the wireless set to idle and then transfer control to decision block 301 of FIG. 3. Returning to decision block 511, if the answer is no, control is transferred to decision block 517.

Figure 6:
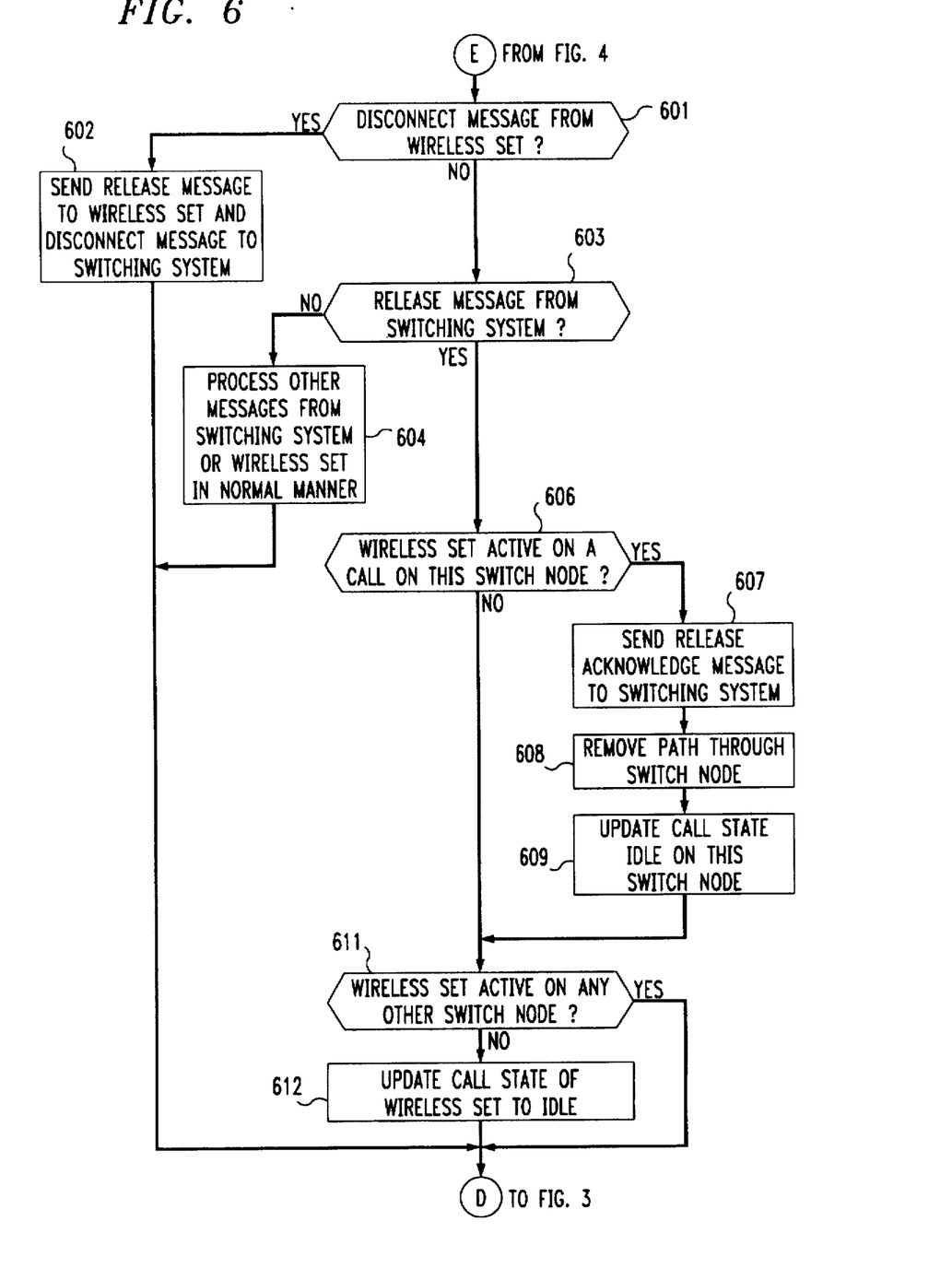

Returning to decision block 509 of FIG. 5, if the answer is no, control is transferred to decision block 601 of FIG. 6. The latter decision block determines if a disconnect message has been received from the wireless set. If the answer is yes, block 602 sends a release message to the wireless set and a disconnect message to the switching system before returning control to decision block 301 of FIG. 3. If the answer is no in decision block 601, decision block 603 determines if a release message was received from the switching system. If the answer is no, block 604 processes other messages from the switching system or the wireless set in a normal manner. If the answer in decision block 603 is yes, decision block 606 determines if the wireless set is active on this node. If the answer is yes, block 607 sends a release acknowledge message to the switching system, and block 608 removes the path through the switch node. Block 609 updates the call state of the wireless set to idle on this switch node before transferring control to decision block 611. Decision block 611 determines if the wireless set is active on any other nodes. If the answer is yes, control is transferred back to decision block 301 of FIG. 3. If the answer in decision block 611 is no, control is transferred to block 612 which updates the call state of the wireless set to idle for all switch nodes. Returning to decision block 606, if the answer is no, control is transferred to decision block 611.

Figure 7:
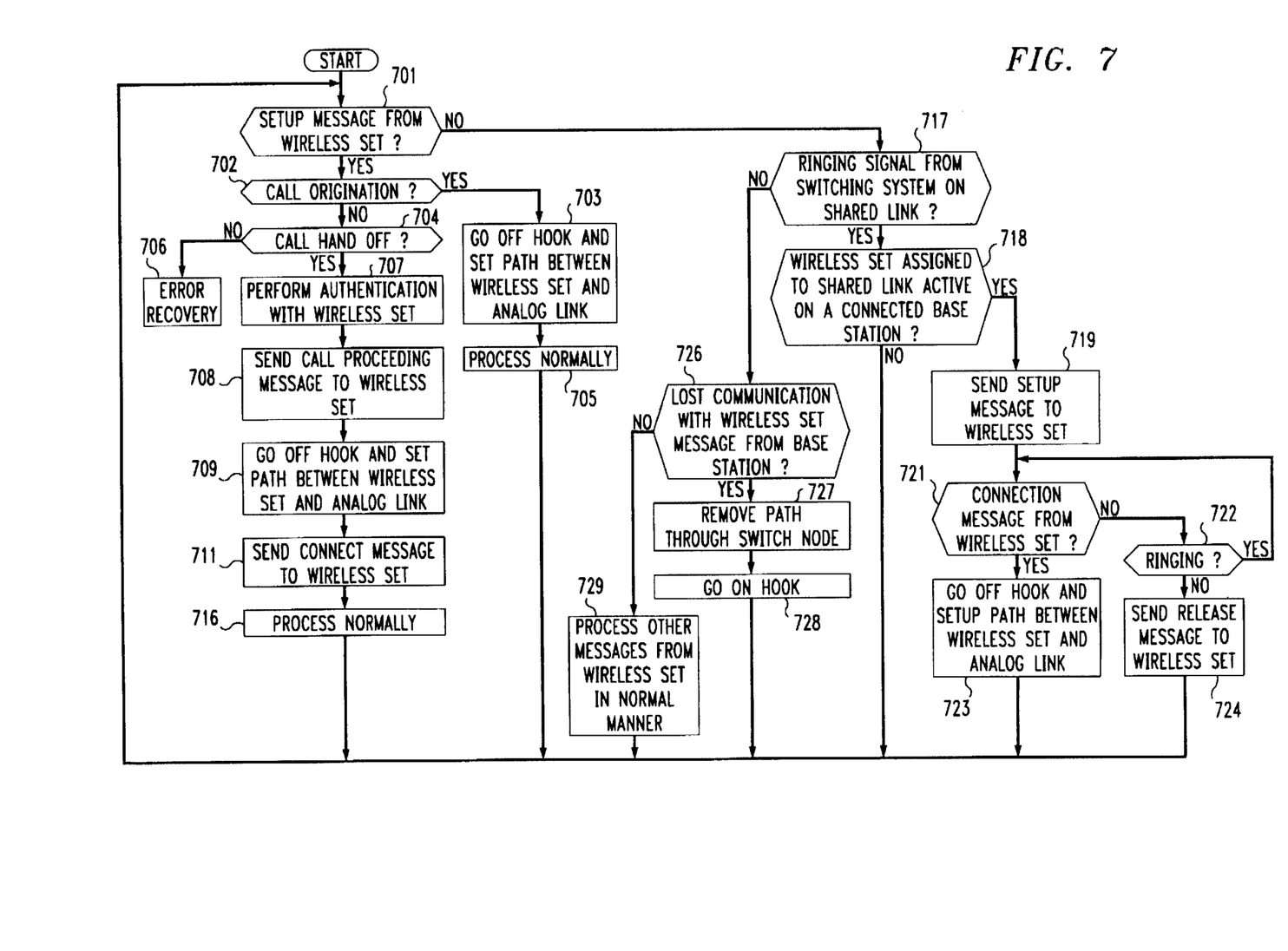
FIG. 7 illustrates operations performed by the switch nodes to implement the second embodiment.

FIG. 7 illustrates the operations performed by the computers of the switch nodes of FIG. 2. Decision block 701 determines if a setup message has been received from the wireless set indicating that the user of the wireless set is making a telephone call or a handoff operation is being performed. If the answer is yes in decision block 701, control is transferred to decision block 702. If the user of the wireless set is originating a call, decision block 702 transfers control to block 703. The latter block goes off hook on the analog interface connected to the analog link from the switching system, and a path is set up between the wireless set and the analog link. Block 705 then does the normal processing to allow the user to set up a call.

If the answer in decision block 702 is no, decision block 704 determines if the wireless set is performing a handoff operation. If the answer is no, block 706 performs error recovery. If the answer in decision block 704 is yes, block 707 performs the authentication operations with the wireless set. Block 708 then sends a call proceeding message to the wireless set. Block 709 goes off hook and sets up a path between the wireless set and the analog link. Block 711 sends a connect message to the wireless set and transfer control to block 716 which processes the call in a normal manner. At this point in time, the user of the wireless set hears dial tone from switching system 209. The user dials the destination telephone number. Switching system 209 sets up the call.

Returning to decision block 701, if the answer is no, control is transferred to decision block 717. Decision block 717 determines if a ringing signal is being received from the switching system on the shared link. If the answer is yes, then there is an incoming telephone call for the wireless set. Decision block 718 determines if the wireless set is connected to a base station on the present switch node. If the answer is no, no action is taken by this switch node. If the answer to decision block 718 is yes, control is transferred to block 719 which transmits a setup message to the wireless set. If the calling party goes on hook during ringing, control processor 206 of FIG. 2 stops ringing on the associated analog interface which is detected by the computer in the switch node. Blocks 721 and 722 wait for a connection message from the wireless set or the calling party going on hook which causes ringing to stop. If a connection message is received from the wireless set, block 723 goes off hook on the analog interface of the switch node and sets up a path between the wireless set and the analog link. If the calling party goes on hook, control is transferred to block 724 which sends a release message to the wireless set.

Returning to decision block 717, if the answer is no, decision block 726 determines if a "lost communication with wireless set" message was received from a base station. If the answer is yes, block 727 removes the path through the switching node, and 728 places the analog interface on hook before transferring control back to decision block 701. If the answer in decision block 726 is no, block 729 processes other messages from the wireless set in a normal manner.

It is to be understood that the above-described embodiments are merely illustrative of the principles of the invention and that other arrangements may be devised by those skilled in the art without departing from the spirit or scope of the invention.

The invention claimed is:

1. An apparatus for interconnecting a plurality of wireless telephones to a telecommunication switching system and the telecommunication switching system having a plurality of telephone links each assigned to an individual one of the plurality of wireless telephones, comprising:

a first wireless system having a plurality of base stations;

the first wireless system terminating each of the plurality of telephone links;

the first wireless system that has a first wireless telephone of the plurality of wireless telephones registered on one of the plurality of base stations of the first wireless system responsive to a call set up message received via a first telephone link of the plurality of telephone links assigned to the first wireless telephone for transmitting a first control message to the first wireless telephone;

the first wireless system responsive to the first wireless telephone answering the call for transmitting a second control message to the telecommunication switching system on the first telephone link;

the first wireless system responsive to a third control message from the telecommunication switching system for establishing a first path from the first wireless telephone to the first telephone link; and a second wireless system having a plurality of base stations and terminating each of the plurality of telephone links responsive to the third control message transmitted by the telecommunication switching system on the first telephone link assigned to the first wireless telephone for recording an active call on another wireless system call state for the first wireless telephone.

2. The apparatus of claim 1 wherein the second wireless system responsive to the first wireless telephone handing off to one of the plurality of base stations of the second wireless system and the call state for the first wireless telephone indicating an active call on another wireless system for transmitting a fourth control message to the telecommunication switching system on the first telephone link;

the second wireless system responsive to a fifth control message from the telecommunication switching system received on the first telephone link for etablishing a second path from the first wireless telephone to the first telephone link; and the first wireless system responsive to the fifth control message for moving the first path.

3. The apparatus of claim 2 wherein the first wireless system further responsive to the fifth control message for recording an active call on another wireless system call state for the first wireless telephone.

4. The apparatus of claim 3 wherein the plurality of telephone links are ISDN links.

5. A apparatus for interconnecting a plurality of wireless telephones to a telecommunication switching system and the telecommunication switching system having a plurality of telephone links each assigned to an individual one of the plurality of wireless telephones and a first wireless system having a plurality of base stations and terminating each of the plurality of telephone links and a second wireless system having a second plurality of base stations and terminating each of the plurality of telephone links, comprising:

the first wireless system that has a first wireless telephone of the plurality of wireless telephones registered on one of the plurality of base stations of the first wireless system responsive to a call set up message received via a first telephone link of the plurality of telephone links assigned to the first wireless telephone for transmitting a first control message to the first wireless telephone;

the first wireless system responsive to the first wireless telephone answering the call for transmitting a second control message to the telecommunication switching system on the first telephone link;

the first wireless system responsive to the first wireless telephone answering the call for establishing a first path from the first wireless telephone to the first telephone link;

the second wireless system responsive to the first wireless telephone handing off to one of the plurality of base stations of the second wireless system for transmitting a third control message to the telecommunication switching system on the first telephone link and establishing a second path from the first wireless telephone to the first telephone link and;

the first wireless system responsive to loss of communication between one of the plurality of base stations of the first wireless system and the first wireless telephone for removing the first path.

6. The apparatus of claim 5 wherein the plurality of telephone links are analog telephone links.

7. A method for interconnecting a plurality of wireless telephones to a telecommunication switching system and the telecommunication switching system having a plurality of telephone links each assigned to an individual one of the plurality of wireless telephones and a first wireless system having a plurality of base stations and terminating each of the plurality of telephone links and a second wireless system having a second plurality of base stations and terminating each of the plurality of telephone links, the method comprising the steps of:

transmitting a first control message to a first wireless telephone by the first wireless system that has the first wireless telephone of the plurality of wireless telephones registered on one of the plurality of base stations of the first wireless system in response to a call set up message received via a first telephone link of the plurality of telephone links assigned to the first wireless telephone;

transmitting a second control message to the telecommunication switching system on the first telephone link by the first wireless system in response to the first wireless telephone answering the call;

establishing a first path from the first wireless telephone to the first telephone link by the first wireless system in response to a third control message from the telecommunication switching system; and recording an active call on another wireless system call state for the first wireless telephone by the second wireless system in response to the third control message transmitted by the telecommunication switching system on the first telephone link assigned to the first wireless telephone.

8. The method of claim 7 further comprises the steps of transmitting a fourth control message to the telecommunication switching system on the first telephone link by the second wireless system in response to the first wireless telephone handing off to one of the plurality of base stations of the second wireless system and the call state for the first wireless telephone indicating an active call on another wireless system;

establishing a second path from the first wireless telephone to the first telephone link by the second wireless system in response to a fifth control message from the telecommunication switching system received on the first telephone link; and removing the first path by the first wireless system in response to the fifth control message.

9. The method of claim 8 further comprises the step of recording an active call on another wireless system call state for the first wireless telephone by the first wireless system further in response to the fifth control message.

10. The method of claim 9 wherein the plurality of telephone links are ISDN links.

11. A method for interconnecting a plurality of wireless telephones to a telecommunication switching system and the telecommunication switching system having a plurality of telephone links each assigned to an individual one of the plurality of wireless telephones and a first wireless system having a plurality of base stations and terminating each of the plurality of telephone links and a second wireless system having a second plurality of base stations and terminating each of the plurality of telephone links, the method comprising the steps of:

transmitting a first control message to a first wireless telephone by the first wireless system that has the first wireless telephone of the plurality of wireless telephones registered on one of the plurality of base stations of the first wireless system in response to a call set up message received via a first telephone link of the plurality of telephone links assigned to the first wireless telephone;

transmitting a second control message to the telecommunication switching system on the first telephone link by the first wireless system in response to the first wireless telephone answering the call;

establishing a first path from the first wireless telephone to the first telephone link by the first wireless system in response to the first wireless telephone answering the call;

transmitting a third control message to the telecommunication switching system on the first telephone link and establishing a second path from the first wireless telephone to the first telephone link by the second wireless system in response to the first wireless telephone handing off to one of the plurality of base stations of the second wireless system and;

removing the first path by the first wireless system in response to loss of communication between one of the plurality of base stations of the first wireless system and the first wireless telephone.

12. The method of claim 11 wherein the plurality of telephone links are analog telephone links.

* * * * *